United States Patent [19]

Akiyama

[11] Patent Number: 4,736,405
[45] Date of Patent: Apr. 5, 1988

[54] COMMUNICATION SYSTEM WITH OPERATION-PROCEDURE GUIDING FUNCTION BY SPEECH

[75] Inventor: Tadahiko Akiyama, 21-10, Saikon-3-chome, Koriyama-shi, Japan

[73] Assignee: Tadahiko Akiyama, Japan

[21] Appl. No.: 696,476

[22] Filed: Jan. 30, 1985

[30] Foreign Application Priority Data

Feb. 3, 1984 [JP] Japan .................................. 59-17085

[51] Int. Cl.[4] ............................................. H04M 3/50
[52] U.S. Cl. ....................................... 379/89; 379/201; 379/211; 379/354; 379/357
[58] Field of Search ......................... 179/18 B, 18 BE; 379/201, 89, 88, 76, 84, 209, 211, 354, 357

[56] References Cited

U.S. PATENT DOCUMENTS

| | | | |
|---|---|---|---|
| 4,320,256 | 3/1982 | Freeman | 379/73 |
| 4,399,331 | 8/1983 | Brown et al. | 379/42 |
| 4,475,189 | 10/1984 | Herr et al. | 370/62 |
| 4,481,383 | 11/1984 | Madon | 379/112 |
| 4,577,067 | 3/1986 | Levy et al. | 379/101 |
| 4,607,144 | 8/1986 | Carmon et al. | 379/79 |

FOREIGN PATENT DOCUMENTS 0095768 12/1983 European Pat. Off. .............. 379/74

OTHER PUBLICATIONS

"Customer Controlled Supplementary Services Using a Voice Guidance System", P. B. Frame et al., ISS, May 1979, (Parts, Fr.), pp. 498–503.

Primary Examiner—Thomas W. Brown
Attorney, Agent, or Firm—Antonelli, Terry & Wands

[57] ABSTRACT

In a communication system, the user can be instructed by a speech message to execute an operation according to the procedure for each of various different services. The switching system within the communication system identifies the kind of service which the user wants and then supplies speech information in a conversational mode to the communication terminal device, thereby instructing the user to execute an operation procedure for the service on the communication terminal device. Therefore, the user can enjoy a desired service even if he has no preliminary knowledge of the operation procedure for the service.

17 Claims, 5 Drawing Sheets

COMMUNICATION SYSTEM WITH OPERATION-PROCEDURE GUIDING FUNCTION BY SPEECH

This invention relates to communication systems and particularly to a telephone system having means for instructing a user by means of a speech message to execute an operation procedure for a selected one of various different services.

Various different services have become available with the development of communication technology, and also, the operation procedure for each of the services in the communication terminals has become complicated and will be more complex in the future. Even such simple terminal equipment as a telephone set which is frequently used at ordinary times needs "dialing", "hooking" and so on for various services. The catalogs for various private branch exchanges list more than 100 services. In practice, however, quite a small number of people utilize only part of the available services. This is because there are many services which are convenient, but too complex in operation to enjoy, and in addition many services are not positively necessary. This invention has for its object to provide means for guiding or instructing the user to execute the operation procedure for a service selected by dialing or pushing a button by the user, thereby enabling the user to enjoy various services without reading the related manual and learning how to operate the equipment for a given service.

For example, in a telephone system, there are now many services in practical use, such as abbreviated dialing, call forwarding, etc. The abbreviated dialing service enables the user to employ relatively simple operation to establish a call by use of an abbreviated code, but the operation for the registration and change of the abbreviated codes vs. directory number will usually oblige the user to consult with the manual. The abbreviated dialing service after being registered is relatively frequently used because the number of the digits to be dialed is small, while the call forwarding service needs a complicated operation for each transfer of a call and an operation for cancelling the registration of this service. Thus, it has not been positively employed. So far, these services could not be utilized readily unless the user read the manual and learned the way to operate the system to obtain these services.

Accordingly, it is an object of the invention to provide a switching system for identifying the kind of a service requested by a user, and then teaching the user by speech, or voice, the whole operation procedure or instructing the user by speech, or voice, to execute a sequence of operations for the procedure step by step, that is, guiding the user in a so-called interactive manner, thereby enabling the user to correctly perform necessary operations even if the user has no preliminary knowledge about the operations.

If the user, for example in a telephone system wants to get optional service, such as the call forwarding service, it is necessary to dial a number of a few digits or below, or to press a function button for specifying the service after picking up the handset and then to make a predetermined operation (dialing, hooking, depressing a button or the like). The function button may be pressed before picking up the handset. These operations are not standardized yet not only in Japan but also in the rest of the world. That is, since each maker designs its own telephone system, the operations for the same service may vary in a switching system made by different manufacturers.

It is another object of this invention to provide a communication system which is capable of providing a desired service of exchange without requiring the user to previously study the operation procedure by employing a speech coding/synthesizing technique such as waveform coding/synthesizing, source coding/synthesizing or vocal-tract coding/synthesizing, into the switching system so as to guide the user to execute the operation procedure for the selected communication service in accordance with the synthesized speech.

According to this invention, there is provided a communication system, wherein sentences, clauses, words and so on necessary for guiding the user in operation of the system are stored in the form of speech parameters if the source coding/synthesizing technique is used, and the central control unit within the switching system reads out speech parameters of necessary sentences, clauses and words according to the situation in which the user was requested to operate, confirm his/her operation and so on, from a speech information file within the switching system, edits the read parameters into a sentence or a composition for instructing the user, and transfers it to the speech guidance trunk within the switching system where the speech parameters are synthesized into a speech, to which the user listens.

Preferred embodiments of the present invention will now be described in conjunction with the accompanying drawings, in which.

An embodiment of a communication system with operation-procedure guiding function by speech according to this invention will be described in detail with reference to the accompanying drawings.

Figure 1:
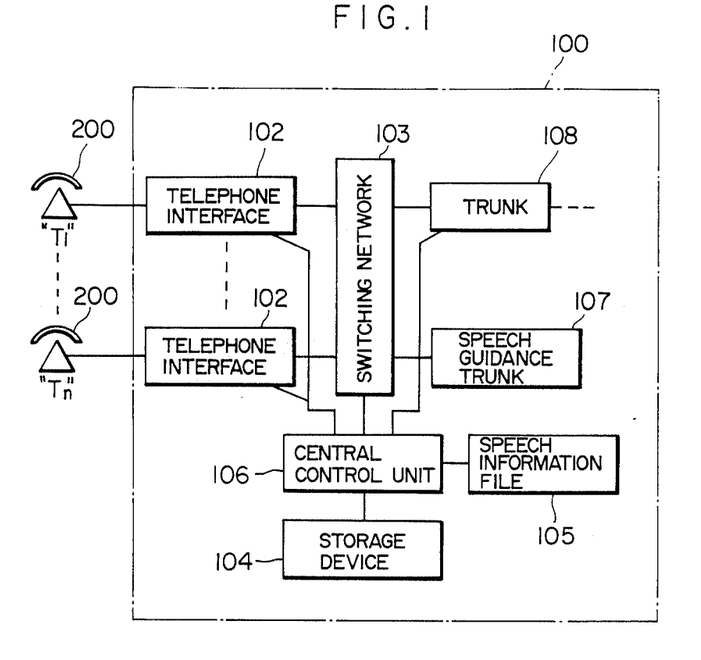
FIG. 1 is a block diagram of a switching system in one embodiment of the present invention.

FIG. 1 shows one example of a switching system as a private branch exchange 100 relating to one embodiment of the present invention. Referring to FIG. 1, there is shown a speech information file 105, in which sentences, clauses, words necessary for the guidance are stored in the form of speech parameters if the source coding/synthesizing technology is used. A central control unit 106 reads from the speech information file 105 speech parameters of necessary sentences, clauses and words in accordance with the situation in which the user is requested to operate, confirm and so on, edits them into a sentence or composition for guiding the user to operate, and transfers the edited speech parameters of the required sentence or composition to a speech guidance trunk 107. The speech guidance trunk 107 synthesizes the speech parameters into a speech signal, which is then supplied through a switching network 103 and a telephone interface 102 to a telephone terminal device 200, by which the user can listen to the guiding speech.

A storage device 104 to which the central control unit 106 is connected is used to store a system program and the information for the cell forwarding service which will be described later. A trunk 108 connected to the switching network 103 and to the central control unit 106 is used for the outgoing connection, incoming connection and so on, essential in the telephone system.

Description will now be made of the registration and cancellation of the call forwarding service, the relation between the guiding information and the operation, and the operation of the switching system.

Figure 2:
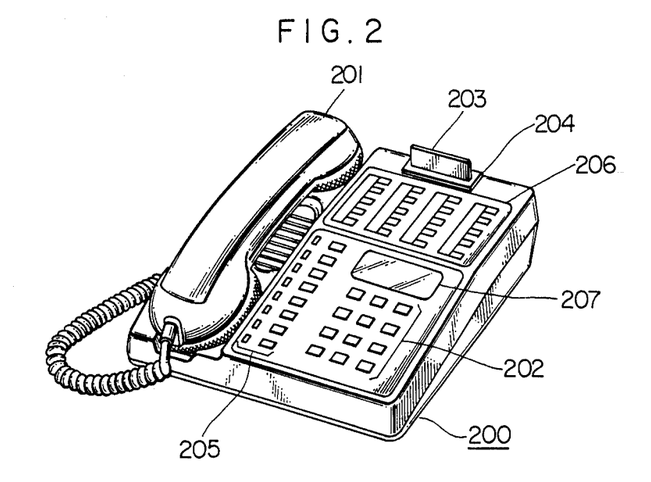
FIG. 2 shows the external appearance of an example of a telephone terminal device (a multi-function telephone set) which is used as a communication terminal device in the present invention.

Although the telephone terminal device 200 may be a normal telephone set equipped only with a dial, in this embodiment this terminal is, as shown in FIG. 2, of the multi-function type which the user can simply operate and be guided by a desired language.

If the call forwarding service registering operation is needed, an ID (Identification) card 203 is inserted into a magnetic card reader 204 of the telephone terminal device 200. The ID card 203 is a magnetic card in which a user's ID code is stored. That is, when there are persons speaking different languages in the same communication system, the kind of language which the user speaks is stored in the user's ID card in order for the user to be guided in that language.

Figure 3:
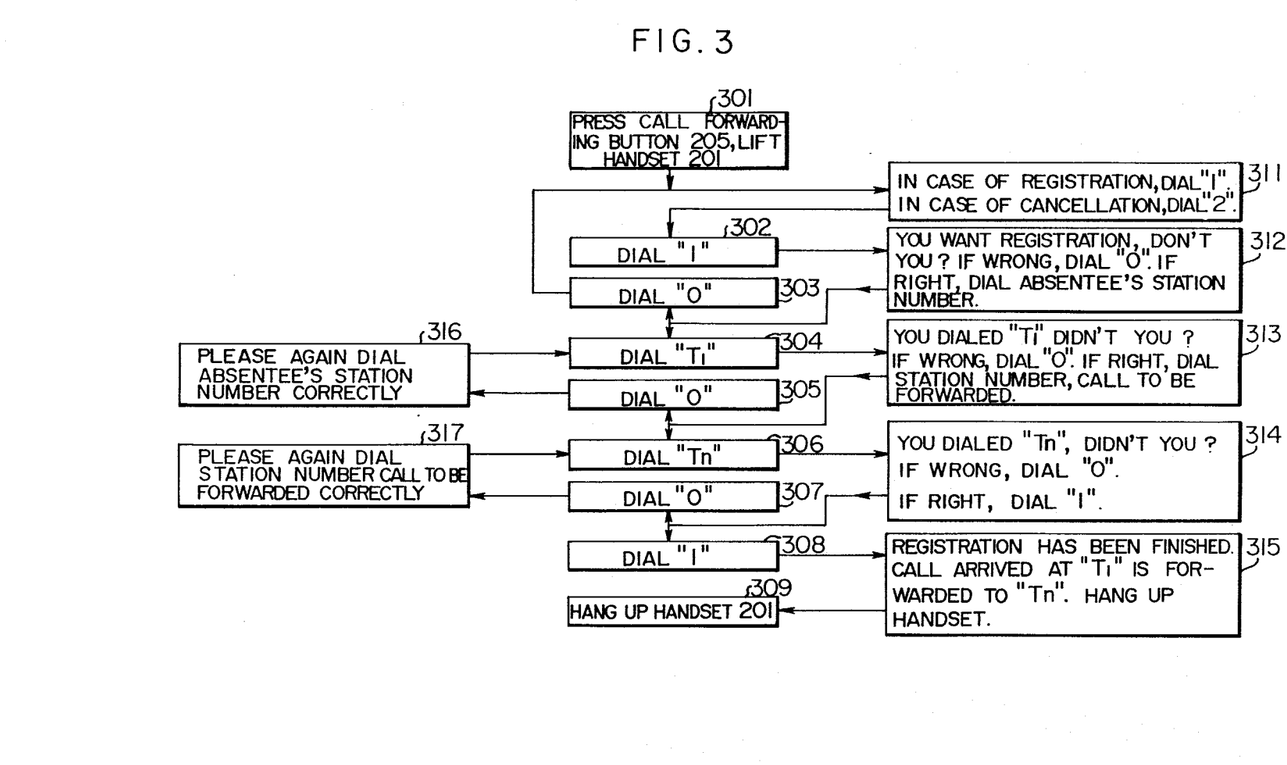
FIG. 3 is a flow chart for the registration of the call forwarding service, showing the relation between the user's operations and the guiding speech from the switching system.

FIG. 3 is a flow chart for the call forwarding service registration in the system of the invention, showing the relation between the operations which the user performs, and the guiding speech from the switching system.

One of the keys of a key/lamp board 205 (a board 206 also may be used) is pressed which is, as shown in FIG. 2, set to the call forwarding mode in advance, and a handset 201 is picked up (FIG. 3, set 301). The switching system 100 announces, "In case of registration, please dial 1. In case of cancellation, please dial 2", through the handset 201 (at step 311, FIG. 3.). If the "registration" is desired, the user dials the number "1" (step 302, FIG. 3) and at this time the switching system 100 announces through the handset, "You want the registration, don't you? If wrong, dial "0". If right, dial the absentee's station number." (step 312, FIG. 3). In this case, if the user dialed the number "1" for the registration by mistake in spite of desiring to cancel the call forwarding mode, the user can return to step 311 by dialing "0" (step 303, FIG. 3). If the user confirms right operation at step 312, the user dials the station number of a person who will be away from his/her office (normally, the user dials user's own station number or his/her secretary dials her chief's station number), for example, number "$T_1$" (a so-called telephone number of several digits) (step 304, FIG. 3). Then, the switching system 100 converts the dialed number to a speech message by means of speech synthesis using the speech information file 105, and announces "You dialed the number "$T_1$", didn't you? If wrong, please dial "0". If right, please dial the station number to which the call is to be forwarded." for the confirmation of the dialed number. Then, the switching system guides the user to perform the next operation (step 313, FIG. 3). If the number is wrong, the user dials "0" (step 305, FIG. 3), and the user listens to the speech for demanding the user to dial at step 316. If the number is right, the user dials the telephone number "Tn" to which a call is to be forwarded (step 306, FIG. 3). At this time, the switching system announces "You dialed the number "Tn", didn't you? If wrong, please dial "0". If right, please dial "1"." (step 314, FIG. 3). If the number is wrong, the user dials "0" (step 307, FIG. 3) and at this time the switching system announces "Please again dial the station number to which the call is to be forwarded" at step 317 in FIG. 3. If the input of the call-forwarded station number is confirmed to be correct, the user dials "1" (step 308, FIG. 3) and at this time the user hears the speech message indicating that the registration procedure has been finished (step 315, FIG. 3). Then, if the user hangs up the handset 201 in FIG. 2, the registration is completed (step 309, FIG. 3).

Description will hereinafter be made of the case where the registered call forwarding mode is canceled.

Figure 4:
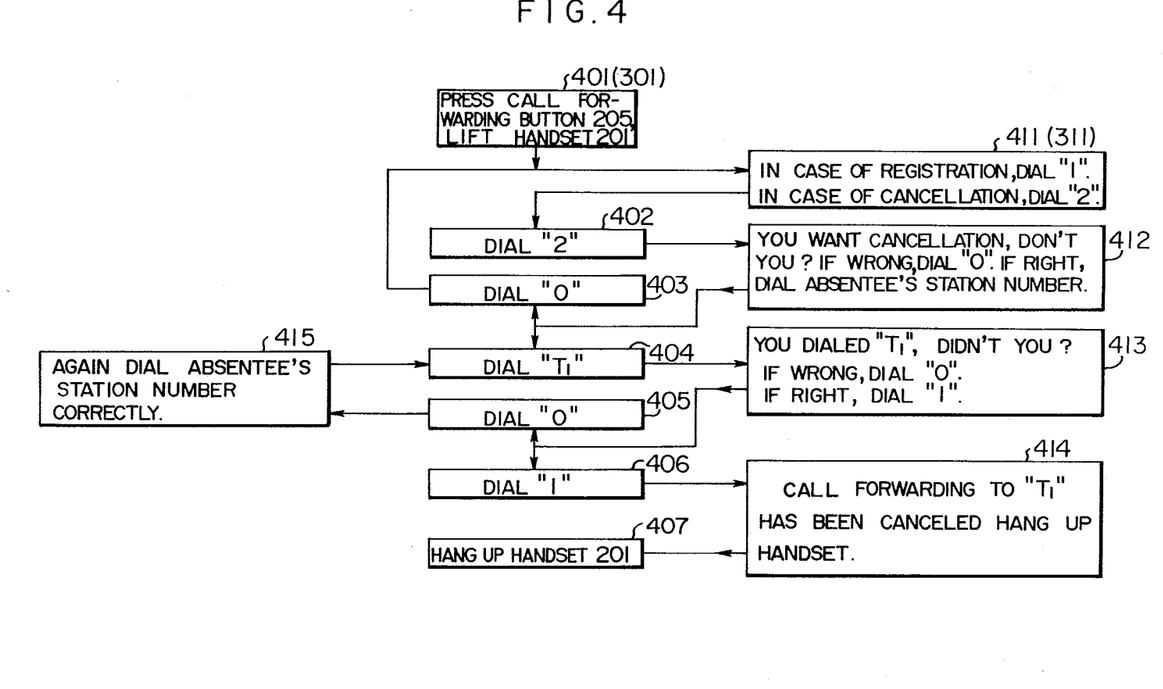
FIG. 4 is a flow chart for cancelling the registered call forwarding service, associated with the flow chart of FIG. 3.

FIG. 4 is a flow chart for canceling the call forwarding mode. In FIG. 4, the steps of inserting the ID card, depressing the call forwarding button, picking up handset and giving the first announcement are the same as those in the case of registering in FIG. 3 (steps 401 and 411 in FIG. 4). Since the number 2 is to be dialed for cancellation, the user dials "2" (step 402 in FIG. 4). Then, the switching system 100 announces "You want cancellation, don't you? If wrong, please dial "0". If right, please dial the station number of the subscriber who was absent" (step 412, FIG. 4). If the announcement is wrong, the user executes the step 403 in FIG. 4 and step 311 in FIG. 3. If the announcement is right, the user dials the number "$T_1$" (step 404, FIG. 4). Here, it is assumed that in the registered call forwarding mode, the call to the number "$T_1$" is forwarded to the number "Tn". Then, the switching system announces "You dialed the number "$T_1$", didn't you? If wrong, please dial "0". If right, please dial "1"." for the confirmation of the dialed number and for the next operation (step 413, FIG. 4). If the number is wrong, the user dials "0"(step 405, FIG. 4), and at this time the user hears the announcement at step 415 in FIG. 4 and again dials the number "$T_1$". Then, if the number is correct, the user dials "1" (step 406, FIG. 4) and hears "The call forwarding to the number "$T_1$" has been canceled. Please, hang up the handset" at step 414 in FIG. 4. Then, the user hangs up the handset 201 (step 407, FIG. 4), thus finishing the "canceling operation".

The operation of the telephone terminal device 200 and the switching system 100 used in this invention will be described briefly in association with the registration and cancellation of the call forwarding service.

Figure 5:
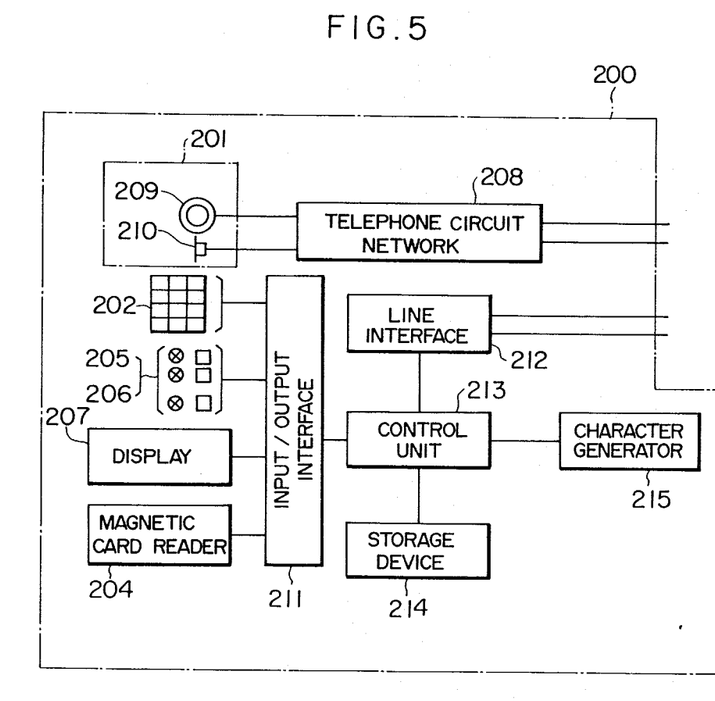
FIG. 5 is a block diagram of the telephone terminal device shown in FIG. 2.
Figure 6:
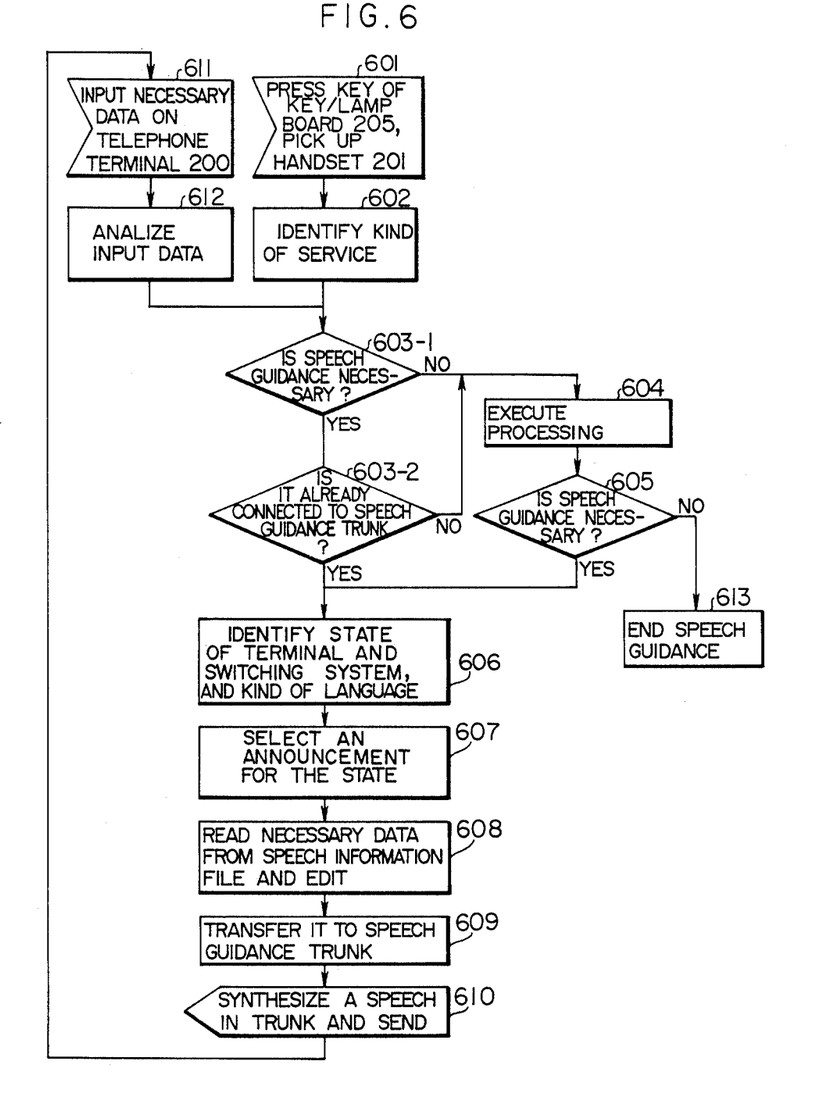
FIG. 6 is a flow chart of the processing operation which the switching system performs for the guiding speech.

FIG. 5 is a block diagram of the telephone set, or terminal device 200 shown in FIG. 2, and FIG. 6 is a flow chart of the process in the switching system 100 in FIG. 1, showing the case of guiding the user to operate in accordance with the synthesized speech.

When the ID card 203 is inserted in the magnetic card reader 204 as shown in FIG. 2, a control unit 213 as shown in FIG. 5 controls the magnetic card reader 204 through an input/output interface 211 so that the user's ID code is read from the card, and controls a storage device 214 to store the read ID code and to keep it therein until the ID card 203 is pulled out of the magnetic card reader 204. When the call forwarding key on the key/lamp board 205 is depressed, similarly the control unit 213 operates to identify this situation through the input/output interface 211 and controls the storage device 214 to store it. When the handset 201 is picked up, the control unit 213 identifies this situation and controls the storage device 214 to read out the ID code and the call forwarding information, and then transfers them through a line interface 212 to the private branch exchange 100. In FIG. 5, shown at 208 is a normal telephone circuit network, 209 a transmitter, and 210 a receiver. The handset 201 is formed of the transmitter 209 and the receiver 201. The telephone circuit network 208 is a circuit for speech and the line interface 212 is a circuit for data transmission. The network 208 and interface 212 are connected to the private branch exchange 100 through the telephone cable.

In the private branch exchange 100 shown in FIG. 1, the ID code and call forwarding information are received by the telephone interface 102 and transferred to the central control unit 106 (FIG. 6, step 601). The central control unit 106, when identifying the call forwarding service (FIG. 6, step 602), controls the storage device 104 to store necessary information and decides whether the service needs speech for guidance or not (FIG. 6, step 603-1). This is because a normally used, basic service such as an outgoing call to the central office needs no guiding speech. The decision step 603-2 in FIG. 6 is provided for the case where the processing is required before the speech guidance, or for the case where the telephone set 200 is required to be connected to the speech guidance trunk 107. Since the telephone set 200 is not connected to the speech guidance trunk 107 yet, the decision at step 603-2 in FIG. 6 is "no", and thus at step 604, in FIG. 6, the number "$T_1$" of the telephone set 200 is connected to the trunk 107 through the telephone interface 102 and the switching network 103. After the switching operation is executed, decision is again made of whether the speech guidance is necessary or not (step 605, in FIG. 6). Since the announcement at step 311 in FIG. 3 is required, the decision at step 605 is "yes". Then, the central control unit 106 identifies contents of the announcement from the state of the telephone set 200 or in this case the condition in which the handset 201 is only picked up with no dialing made, the condition of the switching system 100, or in this case the condition in which the telephone set 200 is only connected to the trunk 107 with no announcement made, and the language used for the announcement, for example, in English from the ID code (step 606 in FIG. 6). This identification corresponds to the step 311 after step 301 in FIG. 3. In the central control unit 106, the announcement shown at 311 in FIG. 3 is selected (step 607, in FIG. 3), the speech information data necessary to make this announcement is read from the speech information file 105 and edited into a speech message for the announcement (step 608, in FIG. 6), the speech signal thus edited is supplied to the speech guidance trunk 107 and stored in a storage circuit which, although not shown, is provided within the trunk 107 (step 609 in FIG. 6). If the source coding/synthesizing technique is used, the speed synthesizing circuit provided within the speech guidance trunk 107 converts the speech parameters received from the central control unit 106 to a speech message signal and supplies it to the telephone set 200 (step 610 in FIG. 6). The announcement may be made only once or repeated until the user performs the next operation. In this case, the speech is stopped by the instruction from the central control unit 106. The speech signal sent from the speech guidance trunk 107 is a digital code in the digital switching system, particularly not limited to an analog form.

When the user hears the announcement at step 311 in FIG. 3 and dials "1", the operation of the push button dial 202 in FIG. 5 is detected by the control unit 213 in the same way as in the call origination and the detected output is supplied to the switching system 100. In the switching system 100, the detected output is supplied through the telephone interface 102 to the central control unit 106 (step 611 in FIG. 6). The central control unit 106 analyzes the dialed number (step 612 in FIG. 6) and decides whether the speed guidance is needed or not (step 603-1, in FIG. 6). In this case, since the speech guidance is necessary, the decision is "yes". Then, after process steps 606 to 610 are executed, the speech in step 312 in FIG. 3 is made. In this way, after each repetition of the steps 603-1, 603-2, 606 to 612, the speech messages at steps 313 to 314 in FIG. 3 and in some case, speech messages at steps 316 and 317 are uttered, and the dialed numbers at steps 304 to 308 are received. When the dialed number at step 308 in FIG. 3 is received, the registration process for the call forwarding is required before the speech at step 315 is made, and thus the decision at step 603-1 in FIG. 6 is "no", with the result that the processing for "registration" is executed at step 604 in FIG. 6. Since the speech at step 315 in FIG. 3 is necessary, the decision at step 605 in FIG. 6 is "yes" and a predetermined speech 315 in FIG. 3 is made.

When the user hangs up the handset 201 of the telephone set 200, this situation is detected at step 611 in FIG. 6, and the decision at step 603-1 is of course "no". Then, at step 604, the telephone set 200 is disconnected from the speech guidance trunk 107, at step 605 the decision is "no", and at step 613 the speech guidance is ended in FIG. 6.

The cancellation operation in FIG. 4 is similarly performed through the process flow shown in FIG. 6. It differs only in the speech for the guidance, and therefore will not be described in detail.

When the telephone terminal 200 equipped with a display 207 shown in FIG. 2 is used during the operations mentioned above, it is possible to visually confirm the number at step 313 in FIG. 3 by means of the display 207. That is, the central control unit 106 sends the received dialed number through the telephone interface 102 back to the telephone terminal device 200, where as shown in FIG. 5 the dialed number is converted to character information by a character generator 215 and then indicated on the display 207.

While in the above embodiment the telephone terminal device with function buttons is used, a general-type telephone set with only a dial may be used, in which case after picking up the handset the access number for the call forwarding is dialed instead of pushing the call forwarding button and the other operations are the same.

Also, the switching system may be of the space-division type or time-division type, and the control system may be the central control type in FIG. 1 or distributed control type as long as it is a stored program control system. In addition, a switching system having a wired logic such as provided in a crossbar switching system may be used as far as such switching system is constructed to operate as follows: when after lifting the handset, the call forwarding mode requested is identified by detecting the dialed number, the telephone set is connected to the speech guidance trunk, the separately provided speech guidance processor directly receives the following dialed numbers set from the telephone set through the speech guidance trunk, and control information is sent and received between the processor and the control unit of the crossbar switching system.

Moreover, a common speech synthesizing circuit having a high speed processing function may be provided for a plurality of speech guidance trunks instead of providing individual speech synthesizing circuits in this embodiment.

Moreover, speech guidance trunk functions may be dispersed in some switching systems instead of being provided in a common trunk as shown in FIG. 1, and in an extreme case, they may be provided for the respective telephone terminal devices.

While the call forwarding service is described in this embodiment, any switching service may be used in this invention.

During the switching operation in the communication systems, various conditions are brought about. If, for example, the called terminal is busy, or internal paths are congested, or the trunk circuits are all busy or encounter some trouble, the conventional system treats these conditions by transmitting a busy tone. When the called terminal device is busy, the caller can wait until the circuit becomes free and be connected as soon as it becomes free, if the system is equipped with the service known as camp-on. In the case of called station busy other services such as call waiting for informing the called busy station of another call, executive override and automatic call back can be considered. However, the kind of the available service is dependent on the system and calling person or terminal. According to this invention, if the called terminal is busy, the switchboard can announce to the caller "This dialed number is now busy. Call waiting and automatic call back service are possible. If you want call waiting, please dial "1" and hold on. If you want automatic call back, please dial "2", hang up the handset and wait." Therefore, this invention can give much better service to the user.

Also, when the terminal enjoying the do-not-disturb service is called from a terminal device having an emergency calling function, the invention can serve to announce "This is now under the do-not-disturb service. If you want emergency calling, please dial "110"."

Therefore, this invention has an excellent effect that it is able to perform not only simple operation guidance but also the guidance for the operation of the available service according to the condition of the system.

The conventional telephone systems have had many problems as described above, such as a switching system of different type needs a different operation for the same service, available services according to a situation are indistinct, and plenty of useful functions provided cannot be effectively employed. In addition, since the operations which the user performs were complicated, the services provided could not be effectively utilized except by reading the operating manual and the way to operate the system for certain services was difficult to memorize. If the speech guidance ability of the invention is introduced into switching systems, available services according to a situation can be indicated in a simple way, the kind of a service which the user wants can be selected by dialing a number or pushing a pushbutton, and then the following operations to be performed by the user can be guided in turn by speech messages even if the user does not know the operation procedure. Therefore, as far as the user knows only the functions of the services, the user can enjoy the services. Accordingly, the communication system including a switching system can be utilized effectively and more conveniently and hence contribute to more effective promotion of office automation and the like.

I claim:

1. A communication system having an operation-procedure guiding function using speech messages, comprising:
   (i) a plurality of communication terminal devices each having means for inputting a request signal for a desired service, including the establishment of a call between a calling communication terminal device and a called communication terminal device;
   (ii) a switching system connected to said communication terminal devices and being responsive to a call request signal from a calling communication terminal device for providing a communication connection between said calling communication terminal device and a called communication terminal device, and having first means for identifying the status of the called communication terminal device which has caused the inability to complete the communication connection when a call has failed to be established between the calling communication terminal device and the called communication terminal device, second means for identifying services available to a user at the calling communication terminal device in each call failure situation, third means for storing elemental coded speech signals from which a vocal message may be generated, fourth means responsive to the call failure situation in said switching system for retrieving and editing elemental coded speech signals from said third means to form a first coded message indicating a reason for call failure on the basis of data supplied by said first means and indicating services available to said called communication terminal device on the basis of data supplied by said second means, and a second coded message responsive to signals indicating a selected service received from the calling communication terminal device for guiding the user at said calling communication terminal device in the operation-procedure for a selected service, fifth means synthesizing a coded message into a vocal message, and sixth means for transmitting a speech synthesized vocal message generated by said fifth means to said calling communication terminal device.

2. A communication system according to claim 1, wherein said fourth means operates to supply a second coded message which when synthesized by said fifth means interactively instructs the user to execute an operation procedure on said calling communication terminal device.

3. A communication system according to claim 1, wherein each communication terminal device is equipped with a display panel and a character generator, said switching system including means for sending a number received from a calling communication terminal device back to the same terminal device, so that a number dialed for employing a desired service is visually confirmed on said display panel provided on said calling communication terminal device.

4. A communication system according to claim 2, wherein each communication terminal device is equipped with a display panel and a character generator, said switching system including means for sending a number received from a calling communication terminal device back to the same terminal device, so that a number dialed for employing a desired service is visually confirmed on said display panel provided on said calling communication terminal device.

5. A communication system according to claim 1, wherein each communication terminal device is equipped with a pushbutton dial for inputting a signal indicating a called number and a key/lamp board for inputting a signal indicating a selected service.

6. A communication system according to claim 2, wherein said communication terminal device is equipped with a pushbutton dial for inputting a signal indicating a called number and a key/lamp board for inputting a signal indicating a selected service.

7. A communication system according to claim 1, wherein if a called communication terminal device is busy, said switching system can offer services including camp-on, call waiting, executive override and automatic call back.

8. A communication system according to claim 2, wherein if a called communication terminal device is busy, said switching system can offer services including camp-on, call waiting, executive override and automatic call back.

9. A communication system having an operation-procedure guiding function using speech messages, comprising:
    (i) a plurality of communication terminal devices each having means for inputting a request signal for a desired service, means for reading out personal information including language information on a portable memory device, and means for transferring a personal information read out from said portable memory device to a switching system; and
    (ii) a switching system connected to said communication terminal devices and responsive to received request signals for establishing and controlling a communication connection between a calling communication terminal device and a called communication terminal device, said switching system having means for storing elemental coded speech signals from which a vocal message may be generated, means responsive to personal information received from the calling communication terminal device for identifying a language in which a user wishes to be guided, means responsive to an identified language information for retrieving and editing elemental coded speech signals from said storing means to form a coded message in the desired language for guiding the user in the operation-procedure for each service, means for synthesizing a coded message into a vocal message, and means for transmitting speech synthesized vocal message to said calling communication terminal device.

10. A communication system according to claim 9, wherein said switching system further includes means for identifying a reason of call failure and the status of the call in the switching system when a call has failed to be established between the calling communication terminal device and the called communication terminal device, means for identifying available services for a user at the calling communication terminal device in each call failure situation, and means responsive to the call failure situation in the switching system for retrieving and editing elemental coded speech signals from said storing means to form a coded message indicating a reason for call failure and available services.

11. A communication system according to claim 9, wherein each communication terminal device is equipped with a display panel and a character generator, said switching system including means for sending a number received from a calling communication terminal device back to the same terminal device, so that a number dialed for employing a desired service is visually confirmed on said display panel provided on said calling communication terminal device.

12. A communication system according to claim 10, wherein each communication terminal device is equipped with a display panel and a character generator, said switching system including means for sending a number received from a calling communication terminal device back to the same terminal device, so that a number dialed for employing a desired service is visually confirmed on said display panel provided on said calling communication terminal device.

13. A communication system according to claim 9 wherein each communication terminal device is equipped with a pushbutton dial for inputting a signal indicating a called number and a key/lamp board for inputting a signal indicating a selected service.

14. A communication system according to claim 10 wherein each communication terminal device is equipped with a pushbutton dial for inputting a signal indicating a called number and a key/lamp board for inputting a signal indicating a selected service.

15. A communication system according to claim 10, wherein if a called communication terminal device is busy, said switching system can offer services including camp-on, call waiting, executive override and automatic call back.

16. A communication system according to claim 9, wherein said retrieving and editing means operates to form a coded message which when synthesized interactively instructs the user to execute an operation procedure on said communication terminal device.

17. A communication system according to claim 10, wherein said retrieving and editing means operates to form a coded message which when synthesized interactively instructs the user to execute an operation procedure on said calling communication terminal device.

* * * * *

UNITED STATES PATENT AND TRADEMARK OFFICE
CERTIFICATE OF CORRECTION

PATENT NO. : 4,736,405
DATED : April 5, 1988
INVENTOR(S) : T. AKIYAMA

It is certified that error appears in the above-identified patent and that said Letters Patent is hereby corrected as shown below:

ON THE TITLE PAGE:

Please correct the [73] Assignee from "Tadahiko Akiyama, Japan" to --HITACHI TELECOM TECHNOLOGIES, LTD.--

Signed and Sealed this

Fourteenth Day of March, 1989

Attest:

DONALD J. QUIGG

Attesting Officer

Commissioner of Patents and Trademarks